(12) United States Patent
Ki et al.

(10) Patent No.: US 12,298,818 B2
(45) Date of Patent: May 13, 2025

(54) DISPLAY DEVICE

(71) Applicant: LG ELECTRONICS INC., Seoul (KR)

(72) Inventors: Beomseo Ki, Seoul (KR); Chulhong Kim, Seoul (KR); Hyungchan Lee, Seoul (KR); Jongyun Im, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 181 days.

(21) Appl. No.: 18/158,199

(22) Filed: Jan. 23, 2023

(65) Prior Publication Data

US 2024/0126350 A1    Apr. 18, 2024

(30) Foreign Application Priority Data

Oct. 17, 2022   (KR) .................. 10-2022-0133302

(51) Int. Cl.
*G06F 1/16* (2006.01)

(52) U.S. Cl.
CPC .......... *G06F 1/1681* (2013.01); *G06F 1/1656* (2013.01); *G06F 1/1686* (2013.01)

(58) Field of Classification Search
CPC ...... G06F 1/1633; G06F 1/1656; G06F 1/166; G06F 1/1675; G06F 1/1679; G06F 1/1681

See application file for complete search history.

(56) References Cited

U.S. PATENT DOCUMENTS

| | | | | |
|---|---|---|---|---|
| 6,272,779 B1 * | 8/2001 | Seiber | ............. | G09F 15/0062 40/606.15 |
| 7,450,372 B2 * | 11/2008 | Lin | ............. | G06F 1/1626 361/679.55 |
| 7,660,113 B2 * | 2/2010 | Kaneko | ............. | F16M 13/005 361/679.59 |
| 7,859,853 B2 * | 12/2010 | Schmeisser | ............. | G06F 1/1626 361/752 |
| 12,066,750 B2 * | 8/2024 | Li | ............. | H04N 23/51 |
| 2002/0027613 A1 * | 3/2002 | Tajima | ............. | G06F 1/1605 348/E5.13 |
| 2003/0001053 A1 * | 1/2003 | Cho | ............. | G06F 1/1601 248/122.1 |
| 2006/0077623 A1 * | 4/2006 | Yeh | ............. | G06F 1/1601 348/E5.135 |
| 2007/0090233 A1 * | 4/2007 | Choi | ............. | F16M 13/02 248/922 |
| 2012/0140387 A1 * | 6/2012 | Luo | ............. | G06F 1/1681 361/679.01 |
| 2013/0163197 A1 * | 6/2013 | Mack | ............. | G06F 1/1633 361/679.56 |

(Continued)

*Primary Examiner* — Anthony Q Edwards
(74) *Attorney, Agent, or Firm* — LEE, HONG, DEGERMAN, KANG & WAIMEY

(57) ABSTRACT

Disclosed is a display device, including a display module outputting an image, a body housing having the display module located on a front side, a stand comprising a pair of coupling parts coupled to both horizontal sides of the body housing, respectively and a support part connected to a pair of the coupling parts, and a hinge module fastening the coupling parts of the stand and the body housing together, wherein the hinge module is switchable between a first state having the support part of the stand located in a rear side direction of the body housing and a second state having the support part of the stand located in a first direction of the body housing.

14 Claims, 13 Drawing Sheets

(56) References Cited

U.S. PATENT DOCUMENTS

| | | | |
|---|---|---|---|
| 2015/0085436 A1* | 3/2015 | Dong | G06F 1/166 |
| | | | 361/679.3 |
| 2015/0190114 A1* | 7/2015 | Ninomiya | A61B 8/467 |
| | | | 600/437 |
| 2016/0021769 A1* | 1/2016 | Shin | F16M 11/22 |
| | | | 361/679.01 |
| 2017/0064852 A1* | 3/2017 | Mercier | F16M 13/00 |
| 2017/0135235 A1* | 5/2017 | Mercier | F16M 13/00 |

* cited by examiner (a)

(b)

(a)

(b)

(a)

(b)

(a)

(b)

(a)

(b)

DISPLAY DEVICE

Pursuant to 35 U.S.C. § 119(a), this application claims the benefit of earlier filing date and right of priority to Korean Patent Application No. 10-2022-0133302, filed on Oct. 17, 2022, the contents of which are all hereby incorporated by reference herein in its entirety.

BACKGROUND OF THE DISCLOSURE

Field of the Disclosure

The present disclosure relates to a display device that may be freely moved and easily mounted while minimizing a mounting space.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

Recently, the preference for a display device that is not fixed but freely movable is increasing. There is a need to increase work efficiency while freely moving a display device location in an office, and there is a need for a display device that can meet both portability and convenience of mounting or holding for outdoor use such as camping, etc.

SUMMARY OF THE DISCLOSURE

Accordingly, embodiments of the present disclosure are directed to a display device that substantially obviates one or more problems due to limitations and disadvantages of the related art.

One object of the present disclosure is to provide a display device that can be moved freely and mounted easily while minimizing a mounting space.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a display device according to one embodiment of the present disclosure may include a display module outputting an image, a body housing having the display module located on a front side, a stand comprising a pair of coupling parts coupled to both horizontal sides of the body housing, respectively and a support part connected to a pair of the coupling parts, and a hinge module fastening the coupling parts of the stand and the body housing together, wherein the hinge module is switchable between a first state having the support part of the stand located in a rear side direction of the body housing and a second state having the support part of the stand located in a first direction of the body housing.

The coupling part and the support part of the stand may be vertical to each other.

The coupling part of the stand may include a first portion connected to the support part in a fastening part fastened to the hinge module and a second portion extending from the fastening part in a direction opposite to the first portion.

The hinge module may include a hinge body coupled to the body housing, a hinge shaft extending in a horizontal direction and having one side fixed to the coupling part and the other side accommodated in the hinge body, a lock button having a shaft hole penetrated by the other side of the hinge shaft and configured movable along an extending direction of the hinge shaft, first fastening protrusions and depressions formed on one side of the lock button, and second fastening protrusions and depressions formed to confront the first fastening protrusions and depressions so as to be engaged with the first fastening protrusions and depressions.

The first protrusions and depressions may include a first fastening recess and a second fastening recess more concave than the first fastening recess, and the second fastening protrusions and depressions may include a first fastening protrusion coming in contact with the first fastening recess in the first state or the second fastening recess in the second state.

A width of the first fastening recess may be formed greater than that of the first fastening protrusion.

The display device may include an angle limiting protrusion protruding in a side direction of the second fastening recess, and when the first fastening protrusion touches the angle limiting protrusion, rotation of the hinge shaft may be limited.

The display device may include an elastic part inserted between the lock button and the hinge body and pressurizing the lock button in one side direction of the hinge shaft.

The display device may include a heat dissipation port located in a first direction side portion of the body housing.

The display device may include a pair of camera sockets located on both sides of the body housing in a vertical direction, respectively and a camera module selectively coupled to a pair of the camera sockets.

The camera may be rotatable in front and rear directions.

The camera module may include a guide pin hole formed next to the camera socket.

A rear side of the body housing may include a base plate, a base color layer formed on a rear side of the base plate, a pattern layer having unevenness of a fabric pattern on the base color layer, and an image print layer having an image of a fabric pattern outputted onto the pattern layer.

The image print layer may have a 2-layered structure by being printed twice.

The image print layer may have a pattern corresponding to the unevenness of the pattern layer.

Accordingly, the present disclosure provides the following effects and/or advantages.

A display device of the present disclosure may freely change a mounting direction.

A display device of the present disclosure is advantageous in terms of space utilization because there is little restriction on a mounting location and it can be mounted in a narrow space.

A display device of the present disclosure may mount a camera module without a separate cable, thereby providing a work environment optimized for video meetings and the like.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

Figure 1:
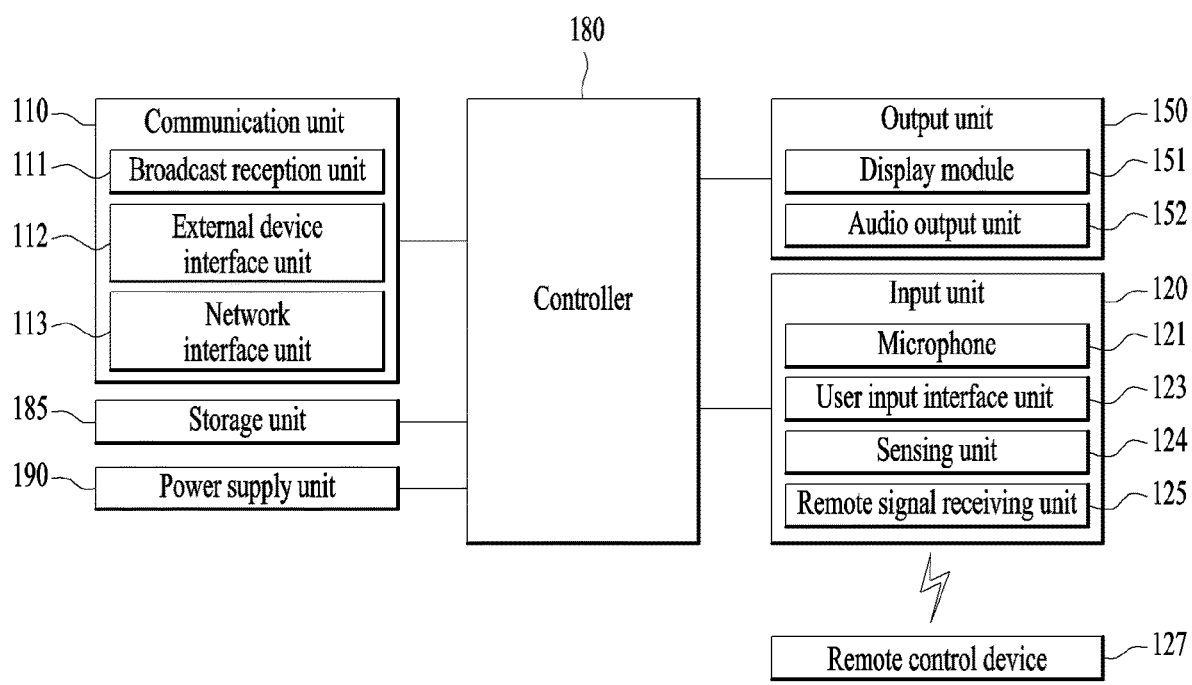
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device 100 described in this specification is, for example, an intelligent image display device 100 having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a block diagram illustrating components of a display device 100.

The display device 100 may include a communication unit 110, an input unit 120, a sensing unit 124, an output unit 150, a controller 180, a storage unit 185, and a power supply unit 190. The configuration shown in FIG. 1 may include only some of the components, and one configuration may perform two functions.

The communication unit 110 may include a broadcast reception unit 111 including a tuner unit and a demodulator. The tuner unit of the broadcast reception unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

Meanwhile, the tuner unit may sequentially select broadcast signals of all broadcast channels stored through a channel memory function, among received broadcast signals, and may convert each of the selected broadcast signals into an intermediate frequency signal or a baseband video or audio signal The demodulation unit of the broadcast reception unit 111 may receive the digital IF (DIF) signal converted by the tuner unit, and may perform demodulation. After performing demodulation and channel decryption, the demodulation unit may output a stream signal (TS). At this time, the stream signal may be a multiplexed image, audio, or data signal.

The stream signal output from the demodulation unit may be input to the controller 180. After performing demultiplexing and image/audio signal processing, the controller 180 may output an image through the display module 151, and may output audio through the audio output unit 152.

An external device interface unit 112 may connect an external device to the display device 100 to receive an image signal, an audio signal, and a control signal from the external device. The interface unit 112 may be connected by wire/wireless to external devices such as a Digital Versatile Disk (DVD), a Blu-ray, a game device, a camera, a camcorder, a computer (laptop), and the like.

The external device interface unit 112 transmits video, audio, or data signals inputted externally to the controller 180 of the display device 100 through the connected external device. In addition, the video, audio, or data signals processed by the controller 180 may be outputted to the connected external device.

The external device interface unit 112 may include a wired type and a wireless type. The wired type includes a physical terminal provided to the display device 100, and the wireless type may be connected to an external device through an antenna that receives a wireless signal.

The wired type may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on.

The wireless type may perform short-range wireless communication with other electronic devices located nearby. The display device 100 may be connected to other electronic devices via networks according to communication standards such as Bluetooth, Radio Frequency Identification (RFID), Infrared Data Association (IrDA), Ultra Wideband (UWB), ZigBee, Digital Living Network Alliance (DLNA), etc.

The network interface unit 113 may access a prescribed web page through a connected network or another network linked to the connected network. That is, the network interface unit 113 may transmit and receive data with a corresponding server by accessing the prescribed web page through the network. In addition, the network interface unit 113 may receive contents or data provided by a content provider or a network operator.

That is, contents such as movies, advertisements, games, VODs, and broadcast signals provided from content providers or network providers and information related to such contents may be received through the network. In addition, update information and update files of firmware provided by the network operator may be received. In addition, data may be transmitted to the Internet or content provider or network operator.

In addition, the network interface unit 113 may select a desired application from applications opened to the public and receive the selected application through the network.

According to an embodiment, when a game application is executed in the display device, the network interface unit 113 may transmit or receive prescribed data to or from a user terminal connected to the display device via the network. Also, prescribed data may be transmitted or received with a server that stores game scores The input unit 120 may include a microphone 121 that collects sound, a user input unit 123 that detects a user's command, a sensor unit that senses a state and surrounding state of the display device, and a remote signal reception unit 125 that receives a signal of a remote controller 127.

The microphone 121 may recognize a user's voice or surrounding sound, and in particular, receive a user's voice and process it as electrical audio data. Various noise cancellation algorithms for removing noise generated in the process of receiving an external audio signal may be implemented in the microphone 121.

The microphone 121 may simply collect user's voice, convert the collected voice into audio data, and store it in the storage unit 185 or transmit it to the external device via the communication unit 110, and may also perform a function as the user input unit 123 in a manner of analyzing the audio data and recognizing it as a user command.

In addition to the main body of the display device 100, the microphone 121 may be mounted on the remote controller 127, which will be described later, and the corresponding audio data may be forwarded to the controller 180 through the remote signal reception unit 125.

The user input unit 123 is a device to which a user inputs a control command for controlling the display device. The user input unit 123 may include a keypad, a button, a touch pad, a touch screen, etc.

When the user input unit 123 includes a hard key button, a user may input a command related to the display device 100 through a push operation of the hard key button. When the user input unit 123 is provided with a touchscreen, the user may input a command related to display device 100 to remote controller 127 by touching the soft key of the touchscreen.

In addition, the user input unit 123 may include various types of input means that the user can operate, such as a scroll key, a jog key, etc., and the present embodiment does not limit the scope of the right of the present disclosure.

Recently, as the size of a bezel of the display device 100 decreases, the display device 100 tends to minimize the user input unit 123 of the physical button type exposed externally. Instead, a minimum physical button is located on a rear side or a lateral side, and a user input may be received from a touchpad or the remote controller 127 through a remote signal reception unit 125 that will be described later.

The remote signal reception unit 125 may input a command related to the display device 100 through the remote controller 127 having the user input unit 123. The remote signal reception unit 125 is a sort of the user input unit 123 and may belong to a wireless communication unit because it receives signals from the remote controller 127 according to various communication methods such as Radio Frequency (RF) communication method, Infrared (IR) communication method, etc.

The sensing unit 124 refers to a device that detects a change in the display device 100 or an external change. For example, the sensing unit 124 may include at least one of a proximity sensor, an illumination sensor, a touch sensor, an Infrared (IR) sensor, an ultrasonic sensor, an optical sensor (e.g., a camera), a voice sensor (e.g., a microphone), a battery gauge, an environment sensor (e.g., a hygrometer, a thermometer, etc.), and the like.

Recently, a display device 100 that can move or change a direction of a display has emerged, and a gyro sensor, an acceleration sensor and the like may be provided to detect a posture of the display device.

Based on the information collected by the sensing unit 124, the controller 180 may check the state of the display device 100 and notify a user of a problem when the problem occurs or adjust it by itself, thereby controlling the display device 100 to maintain a best state.

In addition, the content, image quality, and size of an image provided to the display module 151 may be controlled differently depending on a viewer, a surrounding illumination and the like sensed by the sensing unit 124, thereby providing an optimal viewing environment. As smart TVs advance, functions mounted on the display device increase, and the sensing unit 124 is also increasing correspondingly.

The output unit 150 is a device that provides visual and auditory information to a user through the display device, and may include the display module 151 and the audio output unit 152.

The display module 151 may convert an image signal, a data signal, an OSD signal, and a control signal processed by the controller 180 or an image signal, a data signal, and a control signal received from the interface unit to generate a driving signal. The display module 151 may include a display panel having a plurality of pixels.

Each of the plurality of pixels in the display panel may include RGB subpixels. Alternatively, each of the plurality of pixels in the display panel may include RGBW subpixels. The display module 151 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 151, and a 3D display may also be used. The 3D display 130 may be classified as a non-glasses type display or a glasses type display.

The display device 100 includes a display module 151, which occupies a major portion of the front surface thereof, and a case configured to cover the rear surface and the side surface of the display module 151, the case being configured to package the display module 151.

In recent years, the display device 100 has used a flexible display module 150, such as light-emitting diodes (LED) or organic light-emitting diodes (OLED), in order to implement a curved screen.

The display module 151 is available.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid 2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply unit, and a first signal module located at a rear surface of the display panel. The display panel may include a plurality of pixels R, G, and B. The plurality of pixels R, G, and B may be formed at intersections between a plurality of data lines and a plurality of gate lines. The plurality of pixels R, G, and B may be disposed or arranged in a matrix form.

For example, the plurality of pixels R, G, and B may include a red subpixel a green subpixel G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface. Meanwhile, the display module 150 may be constituted by a touchscreen, whereby an input device may also be used in addition to an output device.

The audio output unit 152 receives an audio signal processed by the controller 180 and outputs the same as audio.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit, the demodulation unit the external device interface unit 112, or the network interface unit 113, or may process demultiplexed signals to generate and output a signal for image or audio output.

An image signal processed by the controller 180 may be input to the display module 151, which may display an image corresponding to the image signal. In addition, the image signal processed by the controller 180 may be input to an external output device through the external device interface unit 112.

An audio signal processed by the controller 180 may be output through the audio output unit 152. In addition, the audio signal processed by the controller 180 may be input to an external output device through the external device interface unit 112. Although not shown in FIG. 2, the controller 180 may include a demultiplexing unit and an image processing unit.

Further, the controller 180 may control the overall operation of the display device 100. For example, the controller 180 may control the tuner unit such that a broadcast corresponding to a channel selected by a user or a pre-stored channel is tuned.

In addition, the controller 180 may control the display device 100 according to a user command input through the user input interface unit or an internal program. Meanwhile, the controller 180 may control the display module 151 to display an image. At this time, the image displayed on the display module 151 may be a still image or video, or may be a 2D image or a 3D image.

Meanwhile, the controller 180 may perform control such that a predetermined 2D object is displayed in an image displayed on the display module 151. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera; however, the present disclosure is not limited thereto. The photographing unit may be implemented by a plurality of cameras. Meanwhile, the photographing unit may be embedded in the display device 100 above the display module 151, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 151 corresponding to the location of the user.

The controller 180 may sense user gesture based on the image captured by the photographing unit, a signal sensed by the sensor unit, or a combination thereof.

The storage unit 185 may store programs for signal processing and control in the controller 180, and may store a processed image, audio, or data signal. For example, the storage unit 185 may store application programs designed to execute various tasks that can be processed by the controller 180, and may selectively provide some of the stored application programs in response to request of the controller 180.

Programs stored in the storage unit 185 are not particularly restricted as long as the programs can be executed by the controller 180. The storage unit 185 may temporarily store an image, audio, or data signal received from an external device through the external device interface unit 112. The storage unit 185 may store information about a predetermined broadcast channel through a channel memory function, such as a channel map.

FIG. 1 shows an embodiment in which the storage unit 185 and the controller 180 are separately provided; however, the present disclosure is not limited thereto. The storage unit 185 may be included in the controller 180.

The storage unit 185 may include at least one of a volatile memory (e.g. DRAM, SRAM, or SDRAM), a nonvolatile memory (e.g. flash memory), a hard disk drive (HDD), and a solid-state drive (SSD).

The power supply unit 190 may supply power to the components of the display device 100. In particular, the power supply unit may supply power to the controller 180, which may be implemented in the form of a system on chip (SOC), the display module 150 for image display, and the audio output unit 160 for audio output.

Specifically, the power supply unit 190 may include an AC/DC converter (not shown) configured to convert AC power into DC power and a DC/DC converter (not shown) configured to convert the level of the DC power.

Meanwhile, the power supply unit 190 serves to distribute power supplied from the outside to the respective components of the display device. The power supply unit 190 may be directly connected to an external power supply in order to supply AC power, or may include a battery so as to be used by charging.

In the former case, a cable is used, and the power supply unit is difficult to move or the movement range of the power supply unit is limited. In the latter case, the power supply unit is free to move, but the weight of the power supply unit is increased in proportion to the weight of the battery, the volume of the power supply unit is increased, and, for charging, the power supply unit must be directly connected to a power cable or must be coupled to a charging holder (not shown) that supplies power for a predetermined time.

The charging holder may be connected to the display device through a terminal exposed to the outside, or the battery mounted in the power supply unit may be charged in a wireless manner when the power supply unit approaches the charging holder.

Meanwhile, the block diagram of the display device 100 shown in FIG. 1 is for an embodiment of the present disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

Figure 2:
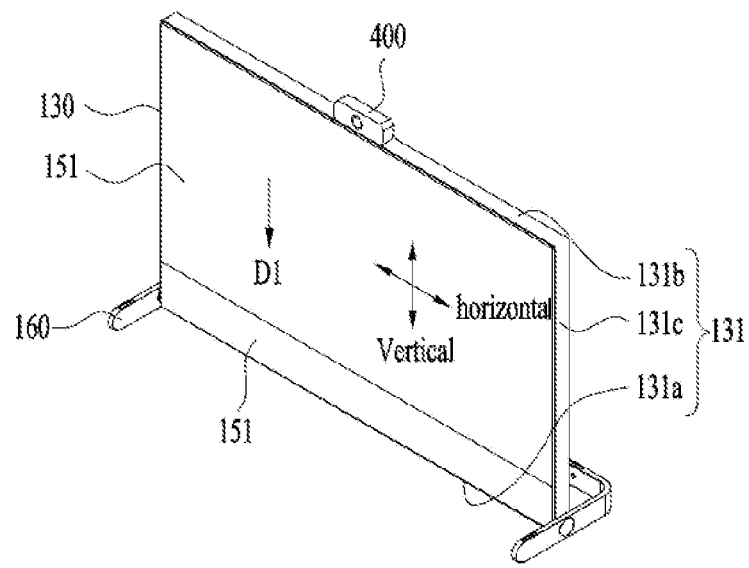
FIG. 2 is a diagram showing a first state of a display device according to the present disclosure.
Figure 2:
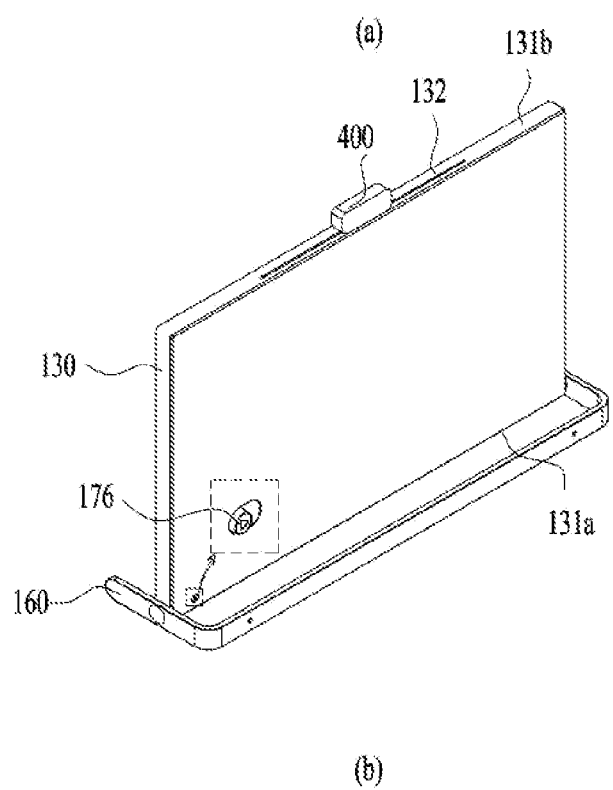
Figure 3:
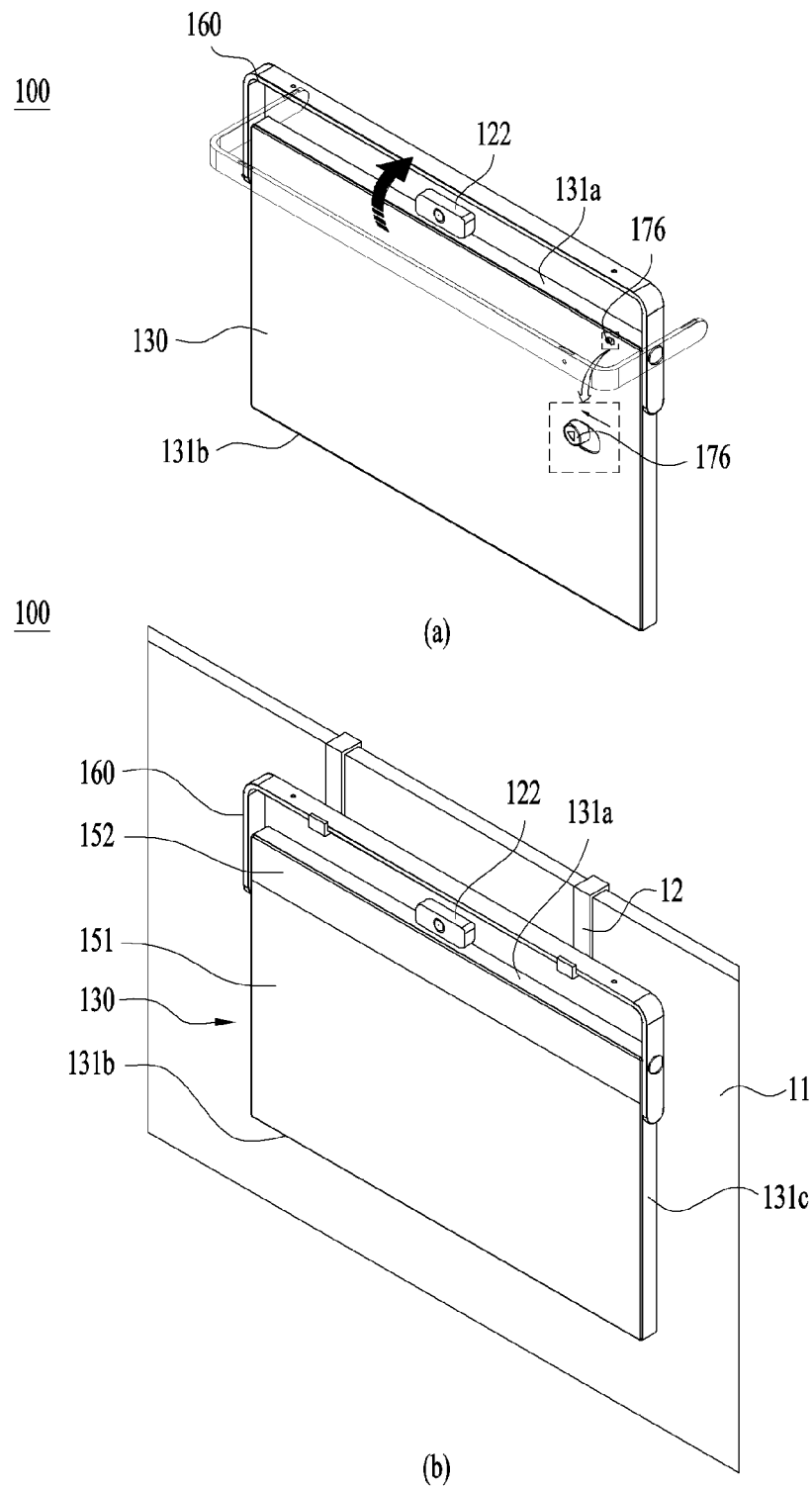
FIG. 3 is a diagram showing a second state of a display device according to the present disclosure.

FIG. 2 is a diagram showing a first state of the display device 100 according to the present disclosure, and FIG. 3 is a diagram showing a second state of the display device 100 according to the present disclosure.

The display device 100 according to the present disclosure may include a body housing 130 having the display module 151 coupled to a front side thereof and a stand 160 coupled to the body housing 130. A side portion 131 of the body housing 130 may be configured to have the same thickness like a picture frame.

The stand 160 is rotatably coupled to both sides of a horizontal direction of the body housing 130 and is located in a manner of being inclined to a first direction (a bottom of FIG. 2) in a vertical direction.

The stand 160 may include a pair of coupling parts 161 coupled to the both sides of the horizontal direction of the body housing 130 and a support part connecting the coupling parts 161. The support part 162 may be configured to form a plane parallel to a rear side 133 or the side portion 131a of the body housing 130 in a manner of being disposed in a vertical direction with respect to the coupling part 161.

For a sense of design unity, the stand 160 may use a plate shape having a wider width on one side such as a tape instead of a pipe shape having a constant thickness. The coupling part 161 may be configured such that a portion in contact with the body housing 130 has a wide surface, and may have a width corresponding to the width of a side portion 131c of the body housing 130.

The display device 100 of the present disclosure may be mounted in two ways. As shown in FIG. 2, the display device 100 may be mounted on the floor. As shown in FIG. 3, the display device may be disposed in a manner of being hung.

When the display device is mounted on the floor, the stand 160 may be located on the floor in the rear direction of the body so that the stand 160 may support the rear surface of the body of the display device 100, and the coupling part 161 may be disposed in a direction vertical to the body housing 130. The coupling part 161 may extend to both sides 1611 and 1612 centering on a fastening part 163 fastened to the lateral side of the body housing 130.

The first portion 1611 is connected to the support part 162 and extends in a rear direction in a first state and the second portion 1612 extends in a front direction of the body housing 130 in the first state to support the display device 100 not to be tilted forward, whereby the display device 100 may be stably disposed in the vertical direction.

Namely, the coupling part 161 serves not only to connect the support part 162 and the body housing 130 but also to maintain a balance in the front-rear direction. An end portion of the other side 1612 protruding forward in the first state may be configured as a curved surface.

As shown in FIG. 3, when the display device is mounted in a manner of being hung on a wall or partition, the stand 160 may be rotated to be placed side by side with the display device 100, and then the main body may be turned over and hung on the wall using the stand 160.

In the first state, the stand 160 is disposed to support the floor. In the second state, the stand 160 hangs the display device 100 on the wall (partition). In the second state, the position at which the stand 160 is coupled to the body housing 130 is not changed, but the top and bottom sides of the body housing 130 are changed. That is, a first side portion (first direction (D1) side portion) 130a, which was the bottom part in the first state, moves to the top part.

In the state of being mounted on the floor, as the front and rear width of the stand 160 is small, the display device may be mounted in a manner of getting close to the wall, and cables may be organized by utilizing a space between the stand 160 in rear and the body housing 130.

When the display device is mounted in a manner of being hung on the wall/partition, the display device 100 may be mounted without occupying a floor space at all because it is in close contact with the wall. In general, since a VESA structure or the like is disposed for a display of a wall-mounted type, the display protrudes from the wall in the front direction, but the display device 100 of the present disclosure is in close contact with the wall to freely utilize a desk space.

The display device 100 of the present disclosure may be mounted in two ways by changing the disposition of the stand 160. As shown in FIG. 2, a state in which the stand 160 and the display device 100 are disposed at an angle of about 90° in between so as to be mounted on the floor is referred to as a first state. As shown in FIG. 3, a state in which the stand 160 is disposed side by side with the display device 100 is referred to as a second state.

The first state may include a structure that locks the angle between the stand and the body housing to support the body housing 130, and the stand 160 may adjust the angle of the stand 160 only when the locking that maintains the angle is released.

In order to switch from the first state to the second state, a lock button 176 located on the rear surface of the body housing 130 should be released as shown in FIG. 3 (a), and the angle of the stand 160 with respect to the body housing 130 should be adjusted.

The lock button 176 is movable horizontally and may be rotated to a position where the support part 162 of the stand 160 faces the first side portion 131a of the body housing 130 after unlocking by sliding the lock button 176 as shown in FIG. 3 (a).

As shown in FIG. 3 (a), in the second state, the coupling part 161 of the stand 160 may be disposed to form 180° with the third side portion 131c positioned in the lateral direction of the horizontal direction of the body housing 130.

As shown in FIG. 3 (b), the display device 100 may be hung on a hook 12 located at the top of a partition. As described above, the top and bottom sides of the display device 100 are changed, and a speaker 152 used to be located at the bottom side in the first state may be moved to the top side in the second state.

Figure 4:
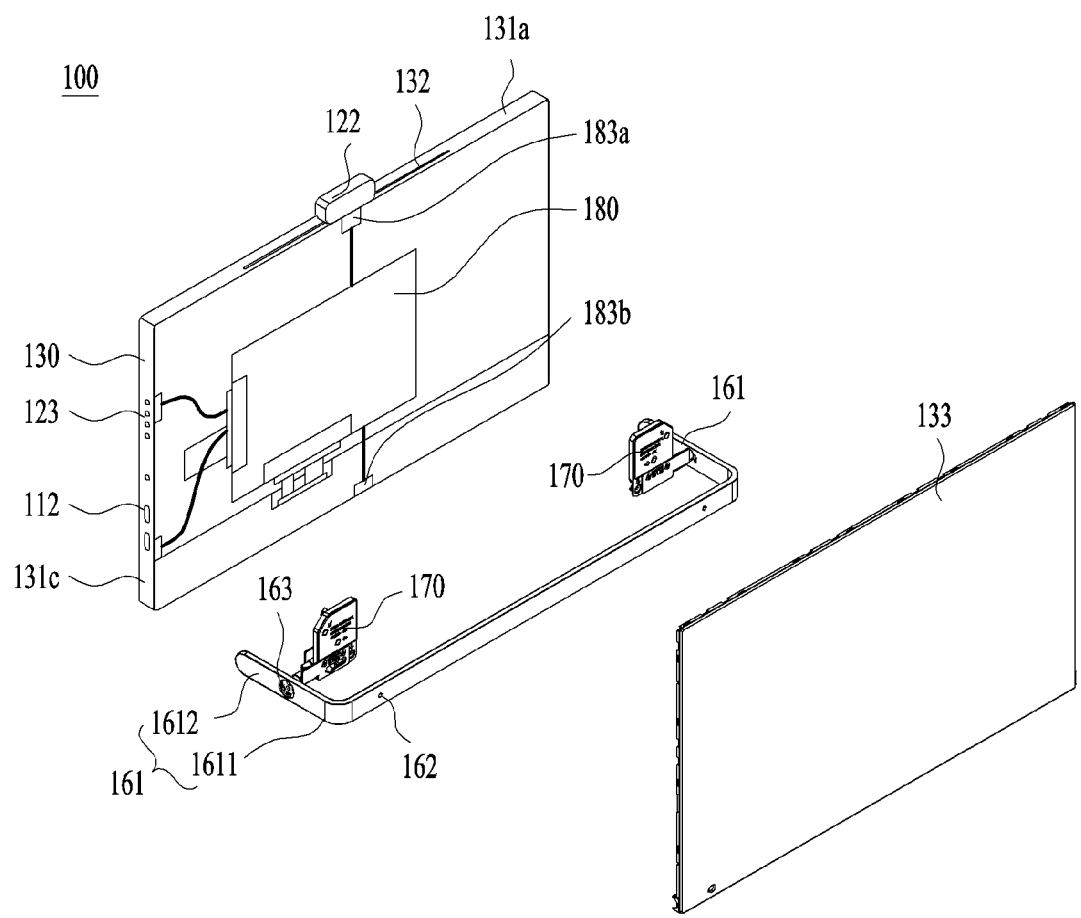
FIG. 4 is an exploded diagram showing that a rear cover and a stand of a display device according to the present disclosure are separated from each other.

A hinge module 170 for changing and fixing the position of the stand 160 will be described in more detail. FIG. 4 is an exploded diagram showing that the rear cover of the display device 100 is separated from the stand 160.

As shown in FIG. 3, the display module 151 may be located on the front side of the body housing 130 and the speaker 152 may be located in the first direction of the display module 151.

On the rear side shown in FIG. 4, such a controller 180 located on the rear side of the display device 100 as a display board, a control board, a power board and the like may be located. A rear cover 133 for covering the controller 180 may be separately provided and coupled thereto.

Since the top and bottom sides of the display device 100 of the present disclosure are switchable and the display device 100 is mounted in a manner that the rear side of the display device 100 is attached to a wall, the external device interface unit 112 and the button 123 connected to the external device may be located on the third side portion 131c of the body housing 130. Buttons 123 of power on/off, sound control and the like and the interface unit 112 (such as USB port, power port, HDMI port, etc.) for connecting to external devices may also be located on the side portion 131c.

A heat dissipation port 132 may be located in the second side portion 131b located on the top side. When the heat dissipation port 132 is disposed in the rear side direction, the heat dissipation port 132 is blocked by the wall in the second state, and thus heat dissipation efficiency may be reduced. Therefore, the heat dissipation port 132 may be located in the second side portion 131b opposite to the first side portion 131a. The second side portion 131b does not contact the floor or the wall in each of the first state and the second state. The heat dissipation port 132 may be disposed in the third side portion 131c, but the heat dissipation port 132 may be disposed in the second side portion 131b in the vertical direction in consideration of the disposition of the user input unit 123 or the interface unit 112.

As shown in FIG. 4, a hinge module 170 is located inside the body housing 130, and may be connected to each of the left and right coupling parts 161. As described above, the hinge module 170 may include a locking device, and in consideration of usability, the locking device may be provided only on one side, and the hinge module 170 on the other side may be provided in a rotatable form without a separate locking device.

Figure 5:
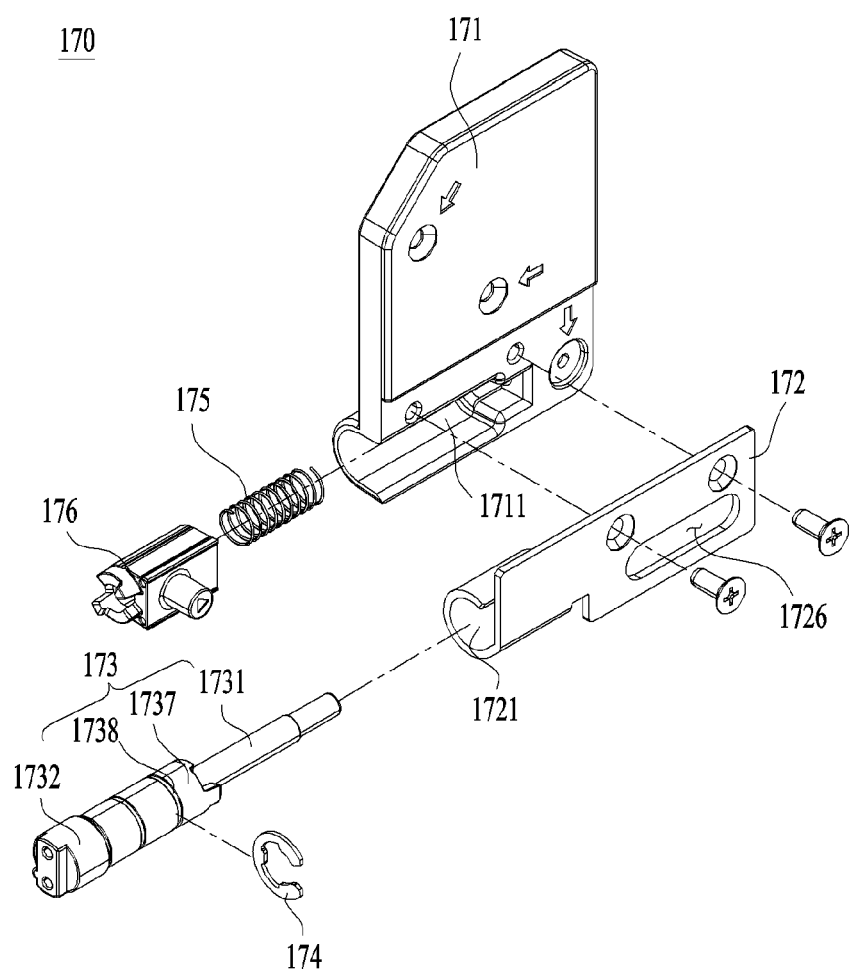
FIG. 5 is an exploded perspective diagram showing a hinge module of a display device according to the present disclosure.
Figure 6:
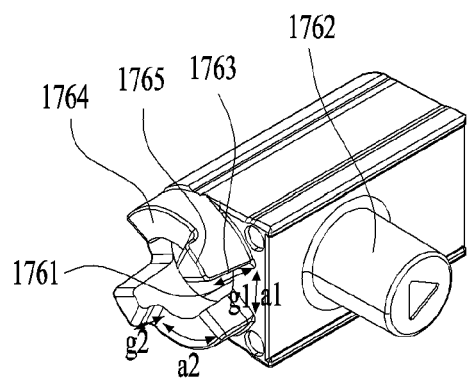
FIG. 6 is a diagram showing a hinge shaft lock button of a display device according to the present disclosure.
Figure 6:
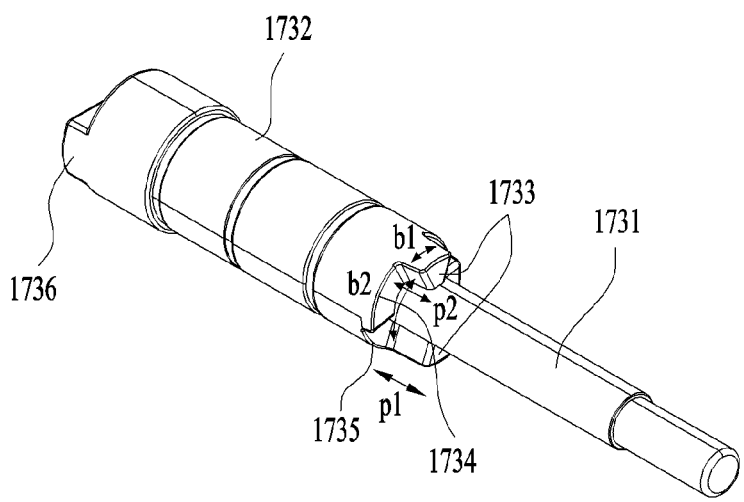

FIG. 5 is an exploded perspective diagram showing the hinge module 170 of the display device 100 according to the present disclosure, and FIG. 6 is a diagram showing a lock button 176 of a hinge shaft 173 of the display device 100 according to the present disclosure.

The hinge module 170 may include a hinge body 171 coupled to the body housing 130, a hinge shaft 173 extending in a horizontal direction and having one side fixed to the coupling part 161 and the other side accommodated in the hinge body 171, and a lock button 176 including a shaft hole 1761 penetrated by the other side of the hinge shaft 173 so as to be movable along the extension direction of the hinge shaft 173.

The hinge body 171 may include a first shaft seating part 1711 on which the hinge shaft 173 and the lock button 176 are seated. A hinge cover 172 may be further included to open a rear side of the first shaft seating part 1711 to insert the lock button 176 into the first shaft seating part 1711.

The hinge cover 172 is coupled to the hinge body 171 while covering the rear side of the first shaft seating part 1711, and may include a slot 1726 extending horizontally so that a button part 1762 of the lock button 176 may be exposed.

The hinge shaft 173 may extend in a horizontal direction, have different diameters between one side 1731 and the other side thereof, and a step difference 1737 may be formed therebetween. A first shaft 1731 is inserted into the shaft hole 1761 of the lock button 176, and a second shaft 1732 protrudes from the hinge body 171 and extends to the side portion 131c of the body housing.

An end portion of the second shaft 1732 may include a screw hole fixed to the coupling portion 161 of the stand and fastened to the coupling part 161. When the direction of the stand 160 is changed, the hinge shaft 173 rotates and may rotate within a range of about 90° depending on the rotation.

A washer 174 coupled to an outer surface of the hinge shaft 173 may be included so that the hinge shaft 173 is not separated from the second shaft seating part 1721. The washer 174 may be coupled to a washer groove 1738 formed on an outer circumferential surface of the hinge shaft 173 to limit the range of movement in one direction of the hinge shaft 173 inside the second shaft seating part 1721.

The lock button 176 is located in the first shaft seating part 1711, and the first shaft 1731 of the hinge shaft 173 can be fitted into the shaft hole 1761 of the lock button 176 with the hinge shaft 173 inserted into the second shaft seating part 1721 of the hinge cover 172.

The hinge cover 172 may be disposed such that a slot extending in a horizontal direction in which the button part 1762 of the lock button 176 can move is formed and the button part 1762 is inserted into the slot, and then the hinge body 171 and the hinge cover 172 may be fastened together.

The lock button 176 may include an elastic part 175 located in the other direction of the lock button 176 when disposed on the first shaft seating part 1711. The elastic part 175 provides a force to push the lock button 176 in one direction and may pressurize the lock button 176 to adhere to the step difference portion 1737 of the hinge shaft 173.

When the lock button 176 contacts the step difference portion 1737 of the hinge shaft 173, the angle of the hinge module 170 may be fixed, and fastening protrusions and depressions may be formed on one side of the locking button 176 and the step difference portion 1737 of the hinge shaft 173.

The lock button 176 may include first fastening protrusions and depressions 1763, 1764, and 1765 formed on one side, and the hinge shaft 173 may include second fastening protrusions and depressions 1733, 1734, and 1735 formed to face the first fastening protrusions and depressions 1763, 1764, and 1765 so as to be engaged with the first fastening protrusions and depressions 1763, 1764, and 1765.

The first fastening protrusions and depressions 1763, 1764, and 1765 and the second fastening protrusions and depressions 1733, 1734, and 1735 are configured with a multi-stage structure and may have a point symmetrical structure of 180°. The first fastening protrusions and depressions 1763, 1764, and 1765 include a first fastening recess 1763 and a second fastening recess 1764, and the first fastening recess 1763 is more concavely recessed in a direction of the other side of the lock button 176 than the second fastening recess 1764.

An angle limiting protrusion 1765 may be included adjacent to the second fastening recess 1764. The angle limiting protrusion 1765 is a device that fixes the stand 160 not to further rotate in the second state so that the support part 162 is prevented from moving toward a front side of the display device 100.

Without the angle limiting protrusion 1765, there is a problem that the position of the stand 160 is not fixed when the stand 160 rotates forward to hang the display device 100 on the hook.

Since the first fastening protrusions and depressions 1763, 1764, and 1765 include the first fastening recess 1763, the second fastening recess 1764, and the angle limiting protrusion 1765 and have the point symmetry structure of 180°, the configuration of the first fastening recess 1763, the second fastening recess 1764, and the angle limiting protrusion 1765 is repeated twice.

Therefore, the second fastening recess 1764 and the angle limiting protrusion 1765 are located on both sides of the first fastening recess 1763, respectively, and the first fastening recess 1763 and the angle limiting protrusion 1765 are located on both sides of the second fastening recess 1764, respectively.

As shown in FIG. 6, the depth g1 of the first fastening recess 1763 is deeper than the depth g2 of the second fastening recess 1764 (g1>g2), and the width a1 of the first fastening recess 1763 is shorter than the width a2 of the second fastening recess 1764.

Here, the width is the length on a circular orbit, so it is expressed as an angle. The width a2 of the second fastening recess 1764 may be about 90° and may have a width corresponding to a rotatable angle range of the stand 160.

The second fastening protrusions and depressions 1733, 1734, and 1735 may have fastening protrusions corresponding to the first fastening protrusions and depressions 1763, 1764, and 1765. A first fastening protrusion 1733 and a second fastening protrusion 1734 are included. And, a concave portion 1735 into which the angle limiting protrusion 1765 is inserted in the first state may be included.

The height p1 of the first fastening protrusion 1733 may correspond to the depth g1 of the first fastening recess 1763, and the height p2 of the second fastening protrusion 1734 may correspond to the depth g2 of the second fastening recess 1764.

Figure 7:
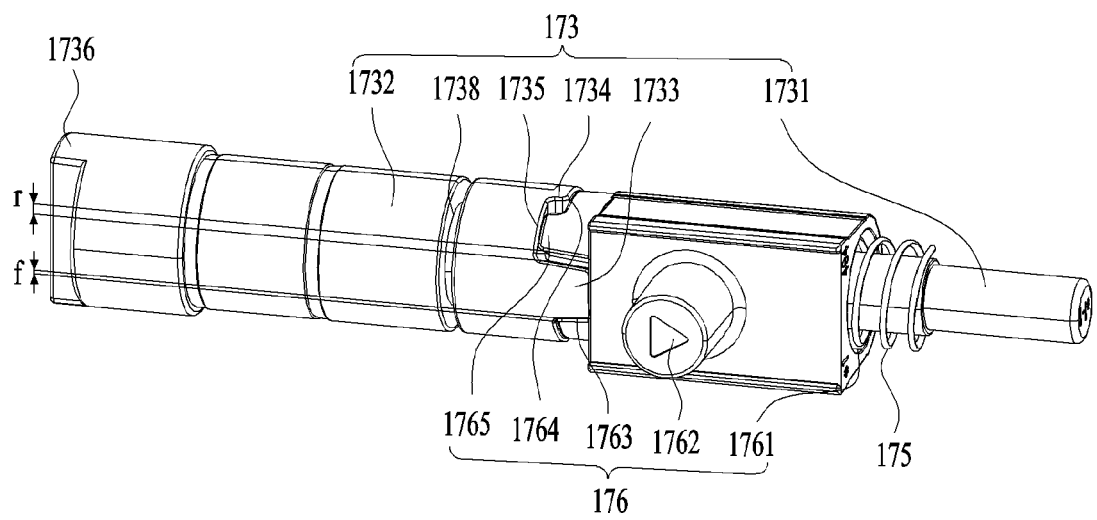
FIG. 7 is a diagram showing the disposition of a hinge shaft and a lock button in a first state of a display device according to the present disclosure.

FIG. 7 is a diagram showing the disposition of the lock button 176 and the hinge shaft 173 in the first state of the display device 100 according to the present disclosure. Hereinafter, the coupling aspects of the first fastening protrusions and depressions 1763, 1764, and 1765 and the second fastening protrusions and depressions 1733, 1734, and 1735 in each of the first and second states will be described in detail.

The first fastening protrusion 1733 is inserted into the first fastening recess 1763, the second fastening protrusion 1734 is inserted into the second fastening recess 1764, and the angle limiting protrusion 1765 is inserted into the concave portion 1735 of the hinge shaft 173.

Figure 8:
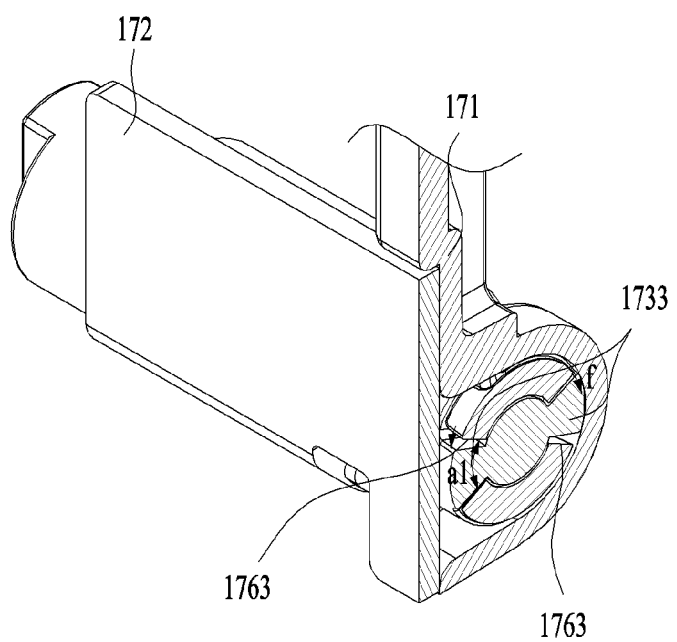
FIG. 8 is a cross-sectional diagram taken along line A-A of FIG. 4.

FIG. 8 is a cross-sectional diagram taken along line A-A of FIG. 4, which may illustrate a state where the first fastening protrusion 1733 is inserted into the second fastening recess 1764 in the first state as illustrated in FIG. 7. A width of the first fastening protrusion 1733 is smaller than a width of the first fastening recess 1763, and empty spaces r and f may be formed on both sides of the first fastening recess 1763 in the first state of forming 90° to the body housing 130.

Figure 9:
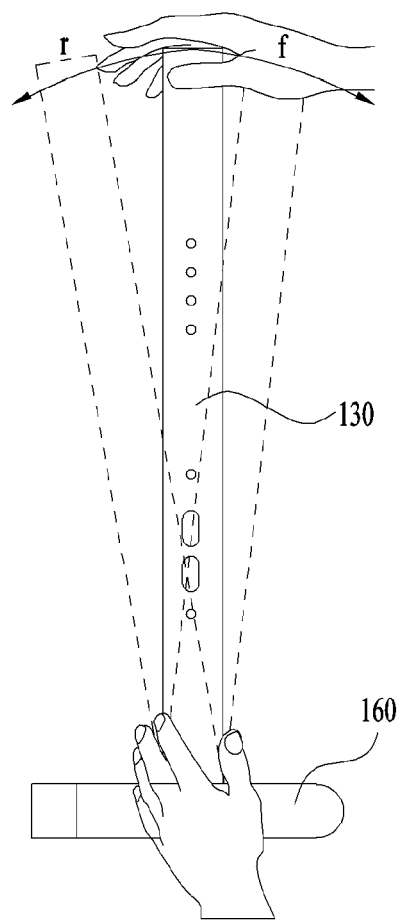
FIG. 9 is a diagram showing a method of adjusting an angle of a display device according to the present disclosure.

FIG. 9 is a diagram showing a method of adjusting an angle of the display device 100 according to the present disclosure. Since the elastic part 175 presses the lock button 176 in the direction of the second fastening protrusions and depressions 1733, 1734, and 1735 of the hinge shaft 173, the hinge shaft 173 is fixed without rotation. Yet, when a user holds and moves the body housing 130 in the front-rear direction, the first fastening protrusion 1733 moves within a range a1 of the first fastening recess, whereby the angle of the body housing 130 may be adjusted.

With reference to FIG. 8, the left side is the rear direction and the right side is the front direction.

When the top end of the body housing 130 is held and pushed in a rear side direction, as shown in FIG. 9, the hinge body 171 and the lock button 176, which are coupled to each other, rotate counterclockwise, whereby the body housing 130 may rotate in the rear direction r.

When the user holds the top end of the body and pushes it in the front direction f, the hinge body 171 and the lock button 176 coupled together may rotate clockwise and tilt in the front direction. Based on FIG. 8. it may observed that the size of the angle rotating in the rear direction is larger with reference to the state of being disposed at 90° on the floor surface.

Considering the height of the user's eyes, since the display module 151 is preferred to be positioned slightly upward, the angle that can be inclined in the rear direction may be configured larger (e.g., rear direction r: about 10°, front direction f: about 5°).

Figure 10:
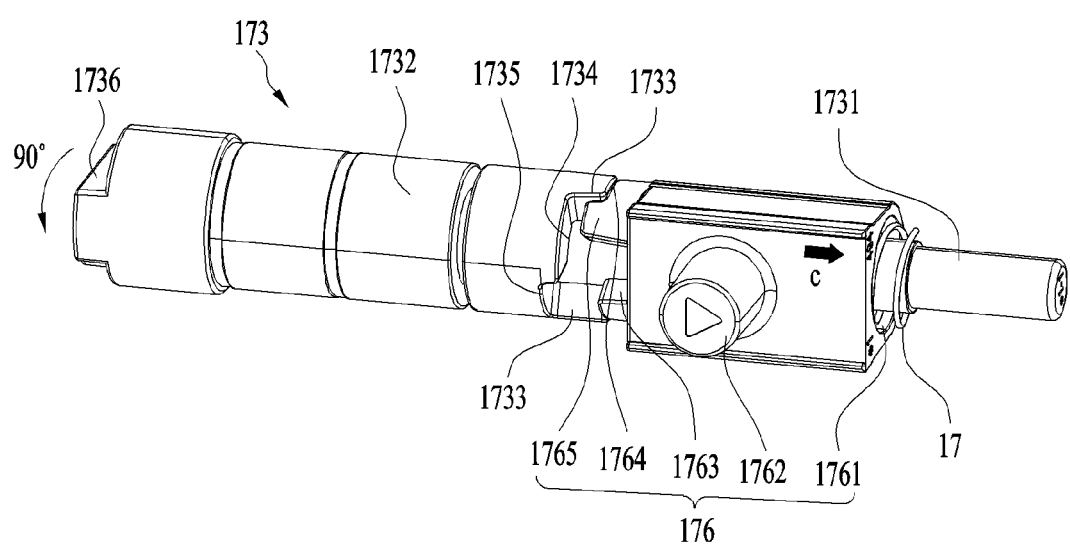
FIG. 10 is a diagram showing the disposition of a hinge shaft and a lock button in a second state of a display device according to the present disclosure.

FIG. 10 is a diagram showing the disposition of the lock button 176 and the hinge shaft 173 in the second state of the display device 100 according to the present disclosure. In order for a user to switch the state of the display device 100 to the second state, the elastic part 175 may be compressed by pressing the lock button 176 in the other side direction. In this case, a movement distance c of the lock button 176 includes a distance greater than or equal to a depth difference (g1−g2) between the second fastening recess 1764 and the first fastening recess 1763.

The lock button 176 should move at least the depth difference between the first fastening recess 1763 and the second fastening recess 1764 so that the first fastening protrusion 1733 may leave the first fastening recess 1763 and move to the second fastening recess 1764.

When the lock button 176 is pushed in the other direction and the stand 160 is rotated to be disposed side by side with the first side portion 131a of the stand 160 on the rear side, the hinge shaft 173 rotates as illustrated in FIG. 10.

When the first fastening protrusion 1733 contacts and rotates with the second fastening recess 1764 and the support part 162 and the first side portion 131a are rotated at opposite positions, the first fastening protrusion 1733 may rotate up to the angle limiting protrusion 1765 of the lock button 176 and then stop.

The lock button 176 may move within a range less than or equal to the depth g1 of the first fastening recess 1763 so that the first fastening protrusion 1733 does not move to a range that does not engage with the angle limiting protrusion 1765. When the first state is switched to the second state, the movement range of the lock button 176 may be limited to a range smaller than or equal to g1 or equal to or greater than (g1−g2).

In the second state, the first fastening protrusions and depressions 1763, 1764, and 1765 and the second fastening protrusions and depressions 1733, 1734, and 1735 are not disposed in an engaged state like the first state, and only a state in which the first fastening protrusion 1733 and the second fastening recess 1764 contact each other may be maintained in a manner of being pressurized by the elastic part 175.

When switching from the second state to the first state, the first state may be entered by pushing only the stand 160 in the rear direction without operating the lock button 176.

Although not shown in the present embodiment, when a locking protrusion is formed between the second fastening recess 1764 and the first fastening recess 1763, the lock button 176 should be slid to the other side and then the stand 160 should be rotated even when switching from the second state to the first state.

Since the top and bottom sides of the body housing 130 are switched to each other in each of the first state and the second state, the top and bottom sides of a screen may be switched to each other depending on the state of the display device 100. In order to control the screen output to the display device 100, a sensor for sensing the first state and the second state may be further included.

The sensor may include a sensor that detects an angle change of the hinge module 170. For example, since the position of the lock button 176 changes when the second state is entered, it is possible to sense that the lock button 176 has been switched to the second state. Alternatively, a screen may be outputted by detecting the top and bottom directions of the display body using a gyro sensor to recognize the direction of gravity and the opposite direction as a bottom side and a top side, respectively.

Top and bottoms sides of the screen is switchable, whereby the speaker 152 positioned below the display module 151 may be positioned on the bottom side in the first state or positioned on the top side in the second state. There is a slight difference in the direction of sound depending on the position of the speaker 152, but since sound is transmitted from the front direction to the ear, there is no significant difference.

The display unit 151 may be located slightly above the floor due to the speaker 152 located on the bottom side of the display module 151 in the first state, and may be placed at a height appropriate for the eye level in the second state of being mounted on a wall due to the speaker 152 located on the top side.

Figure 11:
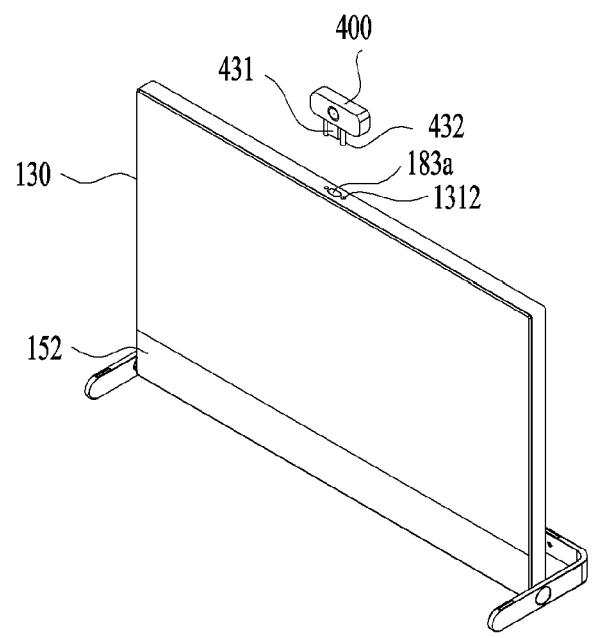
FIG. 11 is a diagram showing a method of coupling a camera module of a display device according to the present disclosure.
Figure 11:
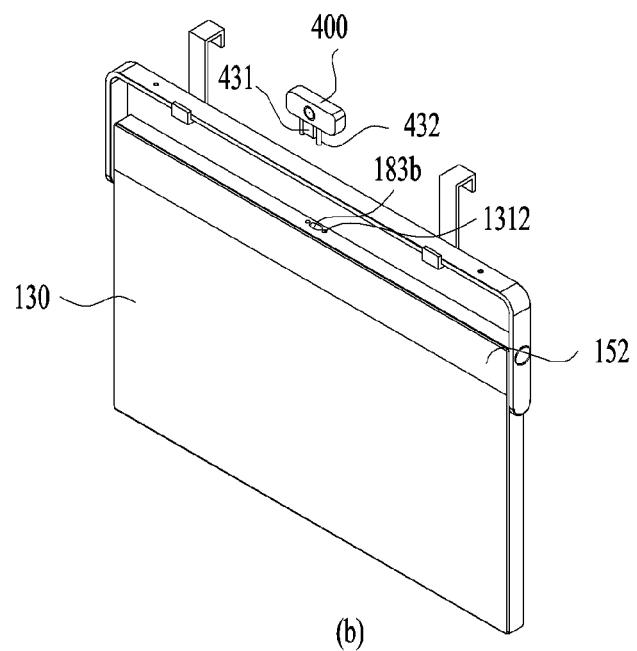

FIG. 11 is a diagram showing a method of coupling a camera module of the display device 100 according to the present disclosure. Recently, there are more and more situations in which webcams are used to conduct video meetings and the like, and a webcam is generally placed on the top side of a display to conduct meetings at the same time while looking at the screen.

However, since the display device 100 of the present disclosure is mounted on a wall surface, it is difficult to fasten a webcam to a top side of the display device 100. When the webcam is integrally configured in the body housing 130 of the display device 100, a top-bottom direction is switched between the first and second states, so if the camera is located below the display module 151, it is inappropriate to take a picture of a face.

Accordingly, the present disclosure provide a camera module 400 that can be easily coupled to the first side portion 131a or the second side portion 131b of the body housing 130 without a separate fastening clip.

Both vertical side portions (i.e., the first side portion 131a and the second side portion 131b) of the body housing 130 may include camera sockets 183a and 183b so that the camera module 400 may be coupled thereto. In the first state, the camera socket 183a of the second side portion 131b and the camera module 400 may be coupled together. In the second state, the camera socket 183b of the first side portion 131a and the camera module 400 may be coupled together.

In the camera socket 183a/183b, a port 431 projected from a bottom end of the camera module 400 is inserted. Rather than simply fixing the camera module 400 thereto, the camera module 400 may be electrically connected via the camera socket 183a/183b to the display device 100.

That is, the information collected by the camera module 400 may be transmitted to a terminal or a computer, which is connected to the display device 100, through the display device 100. Referring to FIG. 4, the camera sockets 183a and 183b are positioned at both sides in the vertical direction, respectively, and are connected to the main board.

When supporting the camera module 400 with only the camera sockets 183a/183b, there is a risk of damage to the camera socket 183a/183b, so additional guide pinholes 1312 may be provided separately from the camera sockets 183a and 183b. A guide pin 432 of the camera module 400 is inserted into the guide pin hole 1312, and the guide pin hole 1312 may be physically fixed without including an electrical connection structure to play a role in improving the stability of the camera module 400.

Figure 12:
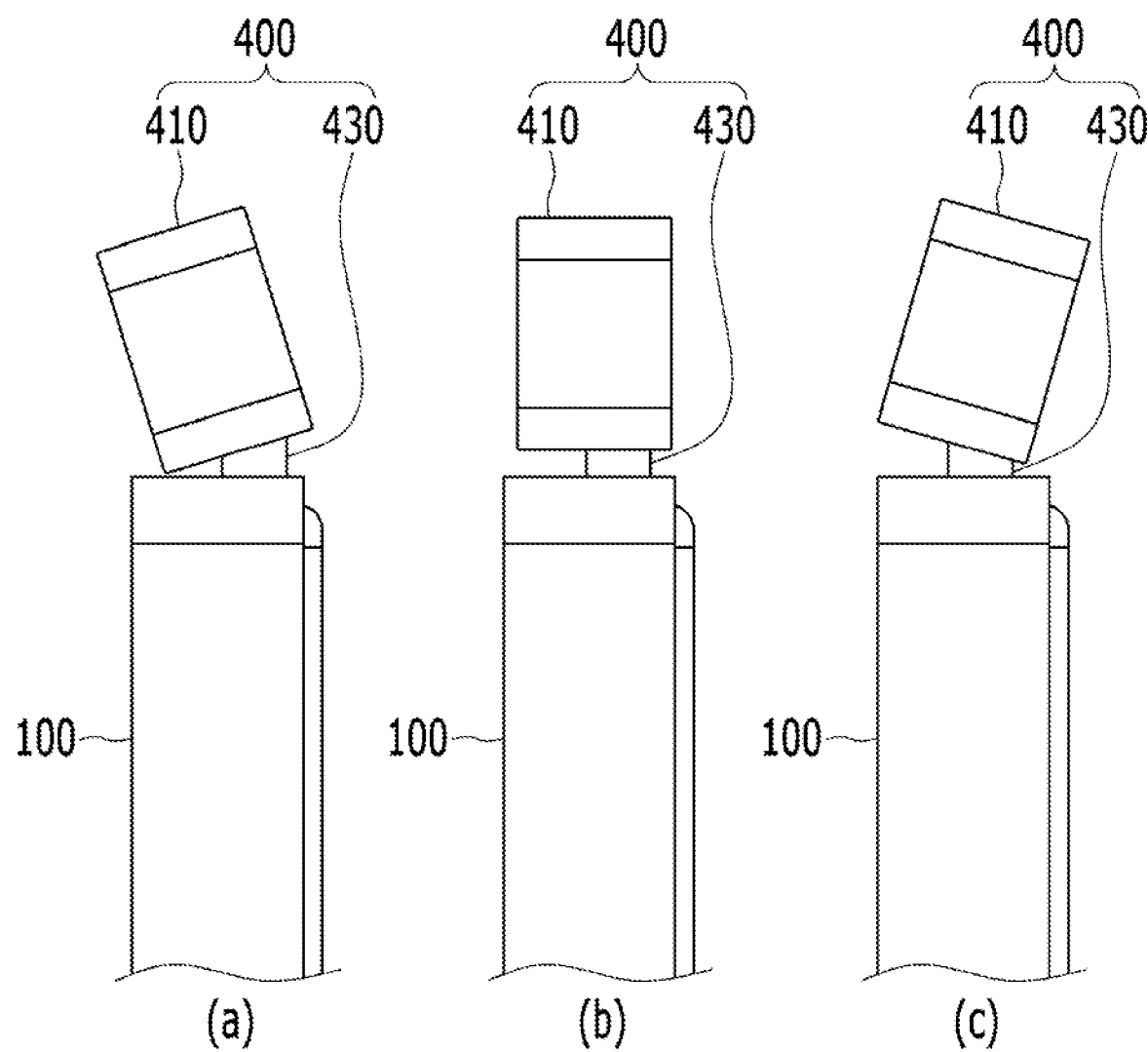
FIG. 12 is a diagram showing an operation of a camera module of a display device according to the present disclosure.

FIG. 12 is a diagram showing an operation of the camera module 400 of the display device 100 according to the present disclosure. As shown in FIG. 12, the camera module 400 of the present disclosure includes a rotating part 430 that can adjust the angle in the front-rear direction to photograph the desired height. As shown in FIG. 12, the guide pin 432 and the guide pin hole 1312 support the force applied to the camera module (400) when the angle is adjusted, thereby preventing damage caused to the camera socket.

Figure 13:
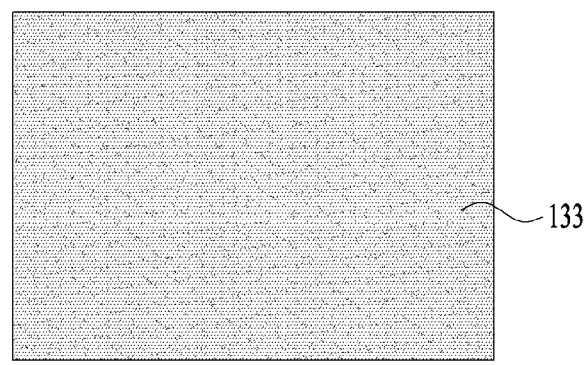
FIG. 13 is a diagram showing a rear side fabric structure of a display device according to the present disclosure.
Figure 13:
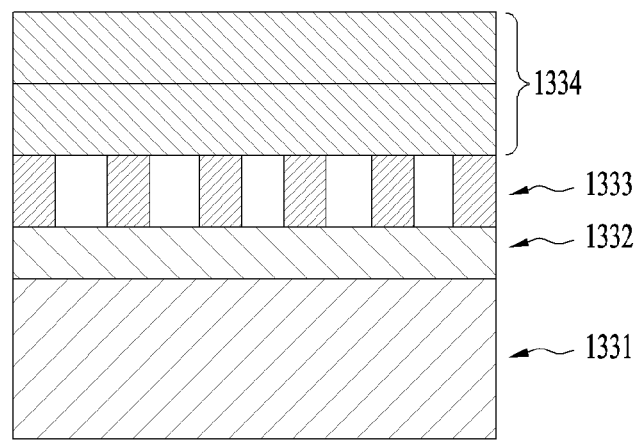

FIG. 13 is a diagram showing a fabric structure of the rear cover 133 of the display device 100 according to the present disclosure. FIG. 13 (a) is a view illustrating the texture of the rear cover 133, and FIG. 13 (b) is a view illustrating a layered structure of the rear cover 133.

The display device 100 slimmed as the present disclosure may be mounted in a manner of moving an installation space freely and easily. In particular, the display device 100 has a smooth rear surface without a structure fastened to the stand 160 on the rear side, and thus can be used while the rear side is exposed.

In order to provide a texture similar to that of a fabric of a partition when used in an office space, a rear cover 133 having the appearance of the fabric texture may be provided. There is a problem of contamination when using the actual fabric, but the fabric texture can be realized through the rear cover 133 having the pattern and irregularities of the fabric.

The fabric texture represents the structure of the yarn woven into a grid, and the layered structure of the rear cover 133 for implementing the fabric texture as shown in FIG. 13 (a) is as shown in FIG. 13 (b).

A base plate 1331 basically has a structure of the rear cover 133 and may be manufactured from an injection-molded material such as ABS. Although it is expressed as a thickness similar to that of other layers in the drawing, it has the thickest thickness. A base color layer 1332 formed on a rear surface of the base plate 1331 provides a basis for viewing the woven pattern shown in FIG. 13 (a), and may use a color (for example, white) different from the color forming the woven pattern.

A pattern layer 1333 may be formed on the base color layer 1332 to express the texture of the fiber thereon. Since the ink constituting the pattern layer 1333 has viscosity, an unprinted empty space may be concave and a printed portion may implement convex unevenness. The pattern layer 1333 may use the same color as the base color layer 1332, but a fabric effect can be additionally obtained by printing a grid pattern with ink of different colors.

Next, an image print layer 1334 may be formed by outputting an image having a fabric pattern. The fabric image corresponds to a step of additionally outputting an image to the pattern layer 1333 having irregularities, and may visually provide a fabric feeling.

Since the image print layer 1334 may be thin and erased, second-degree printing may be performed. For a pattern of the image print layer 1334, a pattern image corresponding to the unevenness of the pattern layer 1333 may be printed.

As described above, the display device 100 of the present disclosure may freely change a mounting direction.

The display device 100 of the present disclosure is advantageous in terms of space utilization because there is little restriction on a mounting location and the display device 100 can be mounted in a narrow space.

The display device 100 of the present disclosure may have the camera module 400 mounted thereon without a separate cable, thereby providing a work environment optimized for video conferences and the like.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A display device comprising:
  a display configured to output an image;
  a body housing having a first side, a second side opposite the first side with respect to a horizontal direction, and a front side on which the display is located;
  a stand comprising a first coupling portion coupled to the first side of the body housing, a second coupling portion coupled to the second side of the body housing, and a support portion connected to the first coupling portion and the second coupling portion; and a hinge portion configured to couple the first coupling portion of the stand to the body housing, wherein the hinge portion is switchable between a first state in which the support portion of the stand is located behind the body housing and a second state in which the support portion of the stand is located above the body housing, wherein the hinge portion comprises:

a hinge body coupled to the body housing;

a hinge shaft extending along the horizontal direction and having a first end fixed to the first coupling portion and a second end accommodated in the hinge body; and a lock button having a shaft hole penetrated by the second end of the hinge shaft, wherein the lock button is movable along the horizontal direction, wherein the lock button has a first fastening recess, a second fastening recess and a first fastening protrusion located at a side of the lock button, and wherein the hinge shaft has a first fastening protrusion, a second fastening protrusion and a first fastening recess to engage with the first fastening recess, the second fastening recess and the first fastening protrusion of the lock button.

2. The display device of claim 1, wherein the first coupling portion and the support portion of the stand are perpendicular to each other.

3. The display device of claim 1, wherein the first coupling portion of the stand comprises:

a first portion connected to the support portion and coupled to the hinge portion at a fastening portion of the first portion; and a second portion extending from the fastening portion in a direction leading away from the first portion.

4. The display device of claim 1, wherein the second fastening recess of the lock button is more concave than the first fastening recess of the lock button, and wherein the first fastening protrusion of the hinge shaft engages with the first fastening recess of the lock button in the first state and engages with the second fastening recess of the lock button in the second state.

5. The display device of claim 4, wherein a width of the first fastening recess of the lock button is greater than a width of the first fastening protrusion of the hinge shaft.

6. The display device of claim 4, wherein the first fastening protrusion of the lock button protrudes along a side of the second fastening recess of the lock button, wherein when the first fastening protrusion of the hinge shaft touches the first fastening protrusion of the lock button, rotation of the hinge shaft is limited.

7. The display device of claim 1, further comprising an elastic portion located between the lock button and the hinge body to pressurize the lock button at the first end of the hinge shaft.

8. The display device of claim 1, wherein the body housing further has a heat dissipation port located at an upper side of the body housing in the first state.

9. The display device of claim 1, wherein the body housing further has a third side and a fourth side opposite the third side with respect to a vertical direction, wherein the display device further comprises:

a first camera socket located on the third side of the body housing;

a second camera socket located on the fourth side of the body housing; and a camera selectively coupled to one of the first camera socket or the second camera socket.

10. The display device of claim 9, wherein the camera is rotatable in front and rear directions.

11. The display device of claim 9, wherein the third side of the body housing has a guide pin hole located next to the first camera socket, and wherein the fourth side of the body housing has a guide pin hole located next to the second camera socket.

12. The display device of claim 1, wherein, at a rear side of the body housing, the body housing comprises:

a base plate;

a base color layer located on a rear side of the base plate;

a pattern layer having an unevenness on the base color layer; and an image print layer having an image of a fabric pattern on the pattern layer.

13. The display device of claim 12, wherein the image print layer has a 2-layered structure by being printed twice.

14. The display device of claim 12, wherein the image of the fabric pattern of the image print layer corresponds to the unevenness of the pattern layer.

* * * * *